United States Patent
Amorim

(10) Patent No.: US 7,667,860 B2
(45) Date of Patent: Feb. 23, 2010

(54) CONTROL ARRANGEMENT FOR A PRINTING SYSTEM

(75) Inventor: Rui M. Amorim, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 795 days.

(21) Appl. No.: 11/335,046

(22) Filed: Jan. 19, 2006

(65) Prior Publication Data

US 2007/0165259 A1    Jul. 19, 2007

(51) Int. Cl.
*G06F 3/12* (2006.01)
*G03G 15/01* (2006.01)

(52) U.S. Cl. .......................................... 358/1.1; 399/39

(58) Field of Classification Search ............... 358/1.1, 358/1.9, 474, 1.4, 1.15, 1.13, 1.14, 1.18, 358/400, 500, 296, 449, 453; 399/8, 9, 16, 399/27, 39, 81, 382, 364; 717/104, 120, 717/174; 713/340, 150, 161, 162, 300, 171, 713/168, 176; 709/202, 219, 223
See application file for complete search history.

(56) References Cited

U.S. PATENT DOCUMENTS

| | | | |
|---|---|---|---|
| 5,493,634 A | 2/1996 | Bonk et al. | |
| 6,526,240 B1 * | 2/2003 | Thomas et al. | 399/72 |
| 6,718,878 B2 * | 4/2004 | Grosso et al. | 101/484 |

* cited by examiner

*Primary Examiner*—Saeid Ebrahimi Dehkordy
(74) *Attorney, Agent, or Firm*—Fay Sharpe LLP

(57) ABSTRACT

A printing system for producing prints from a print job is provided. The printing system includes first and second digital fronts ends as well as an image path. The image path communicates selectively with the first digital front end and the second digital front end, and receives (1) printable information from the first digital front end when the first digital front end and the image path are configured in a first mode, and (2) printable information from the second digital front end when the second digital front end and the image path are configured in a second mode. A selection system disposes the first digital front end and the image path in the first mode, or the second digital front end and the image path in the second mode.

21 Claims, 4 Drawing Sheets

CONTROL ARRANGEMENT FOR A PRINTING SYSTEM

BACKGROUND AND SUMMARY

The disclosed embodiments relate to an improved control system for a printing system and, more particularly, to a switchable digital front end (DFE) implementation permitting multiple digital front ends to be selectively used with a single print engine.

Digital printing systems can be as simple as an office laser printer or can be room size devices that include multiple paper feeders, multiple mark facilities (for example a black and white unit and a color unit), collators, staplers and shrink wrappers. Larger standalone systems, such as the Xerox iGen3™ 110 Digital Production Press include an input module, sometimes referred to as a "digital front end (DFE)," in which various operations are performed on an incoming print job. An example of a complex DFE, performing such operations as decomposition, image processing, and image editing is described in U.S. Pat. No. 5,493,634, the pertinent portions of which are incorporated herein by reference.

It is known that large color publishing systems, such as the Xerox iGen3™ 110 Digital Production Press, can be configured with one of several publicly available DFEs, and it is also known that certain DFEs are better suited for certain document processing applications than others. For example, it is understood that a first type of DFE might be preferred for use in graphic arts applications, while a second type of DFE might be preferred for use in applications other than graphic arts. As the use of large color publishing systems continues to expand, however, it is contemplated that a single shop or user might desire to employ multiple DFEs for the purpose of providing graphic arts and other applications under the "same roof."

There is a desire among graphic arts and standard color printing customers to use multiple DFEs with a single print engine (PE). Also, for field service training and trade shows, there is a demand to demonstrate more than one DFE with a single PE. As understood, alternating DFEs requires a service representative to manually swap DFE cards (and related components) in and out of a host printing system. The swapping process can be time consuming, and the reliability of the host printing system can be jeopardized. In particular, over time, the repeated insertion and removal of image data interface cards (IDICs), along with associated interface connectors, can be harmful to the system. There are several risks associated with continued insertion, including: static discharge damage to the boards, damage to an associated backplane due to disconnect connect cycles, and damage to fiber-optic or other interface cables. It would be desirable to provide an arrangement in which multiple DFEs could be used alternately with a single PE without the need to manipulate related hardware after initial installation.

In accordance with the one aspect of the disclosed embodiments, there is provided a printing system for producing prints from a print job. The printing system includes: a first digital front end capable of decomposing the print job, a second digital front end capable of decomposing the print job and an image path. The image path, which communicates selectively with the first digital front end and the second digital front end, receives a decomposed print job from the first digital front end when the first digital front end and the image path are configured in a first mode, and receives a decomposed print job from the second digital front end when the second digital front end and the image path are configured in a second mode. The printing system further includes a selection system for disposing the first digital front end and the image path in the first mode, or the second digital front end and the image path in the second mode.

In accordance with another aspect of the disclosed embodiments, there is provided a print control system for use with a print engine. The print control system includes a first control subsystem for decomposing a first job to obtain a first set of print-related information, and a second control subsystem for decomposing a second job to obtain a second set of print-related information. The print control system further includes a switching system communicating with the first control subsystem and the second control system. In operation the switching system is disposed in a first switching state at a first time to direct the first set of print-related information from the first control subsystem to the print engine, and is disposed in a second switching state at a second time to direct the second set of print-related information from the second control subsystem to the print engine.

In accordance with yet another aspect of the disclosed embodiments, there is provided a method for producing prints from a print job. The method includes: configuring a first digital front end, a second digital front end and image path in such a way that the image path receives a rasterized print job from the first digital front end when the first digital front end and the image path are configured in a first mode, and that the image path receives a rasterized print job from the second digital front end when the second digital front end and the image path are configured in a second mode; and disposing either the first digital front end and the image path in the first mode, or the second digital front end and the image path in the second mode.

DETAILED DESCRIPTION

Figure 1:
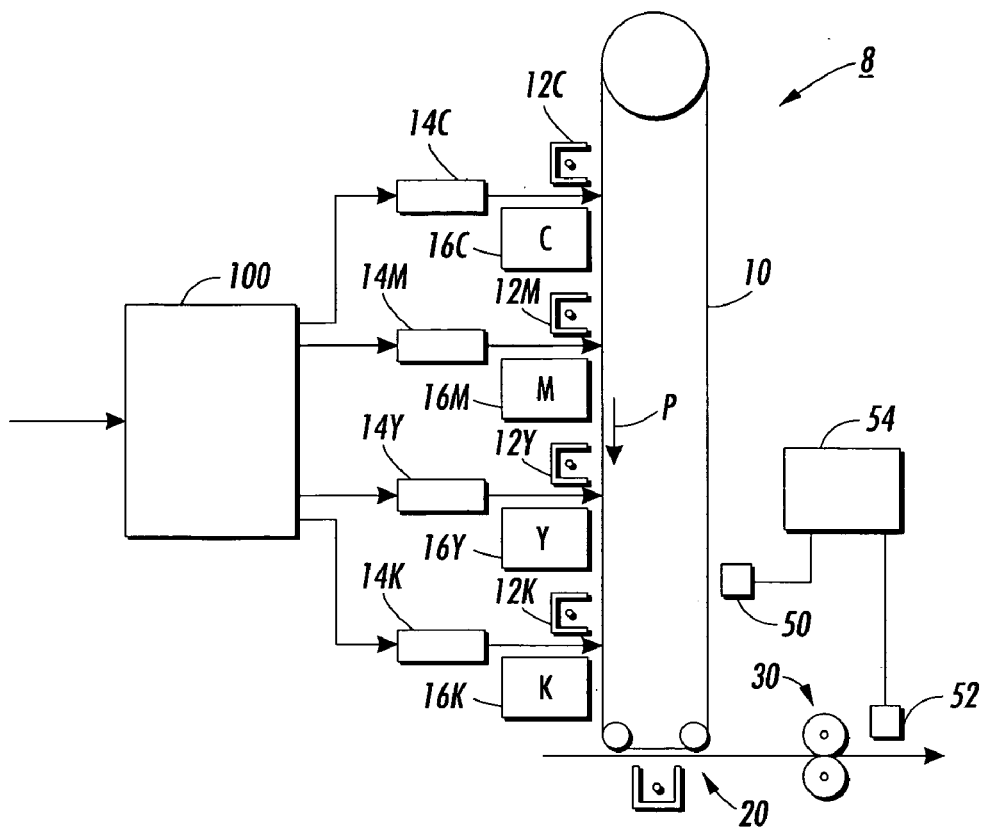
FIG. 1 is a schematic, elevational view of selected elements of a xerographic color printing system.

Referring to FIG. 1, there is shown a simplified elevational view of several elements of an exemplary prior art color printing apparatus. The exemplary color printing apparatus, designated by the numeral 8, employs an "image-on-image" xerographic technology in which successive primary-color images are accumulated on a photoreceptor belt, and the accumulated superimposed images are in one step directly transferred to an output sheet as a full-color image. As will appear, other monochrome or color printing apparatuses, using xerographic or ink-jet based technologies, would be suitable for use with the disclosed embodiments.

As shown in FIG. 1, the prior art printing apparatus 8 includes a belt photoreceptor 10, along which are disposed a series of stations, as is generally familiar in the art of xerography, one set for each primary color to be printed. For instance, to place a cyan color separation image on photoreceptor 10, there is used a charge corotron 12C, an imaging laser 14C, and a development unit 16C. For successive color separations, there is provided equivalent elements 12M, 14M, 16M (for magenta), 12Y, 14Y, 16Y (for yellow), and 12K, 14K, 16K (for black). The successive color separations are built up in a superimposed manner on the surface of photoreceptor 10, and then the combined full-color image is transferred at transfer station 20 to an output sheet. The output sheet is then passed through a fuser 30, as is familiar in xerography. It will be appreciated by those skilled in the art that signals of the imaging lasers 14C, 14M, 14K and 14Y are provided by "digital front end (DFE)," designated by the numeral 100. The image signals vary as a function of image data accepted, stored, produced, decomposed or otherwise presented at the DFE1 100. Further platform related details regarding the DFE1 100 are provided in U.S. Pat. No. 6,718,878, the pertinent portions of which are incorporated herein by reference.

Figure 2:
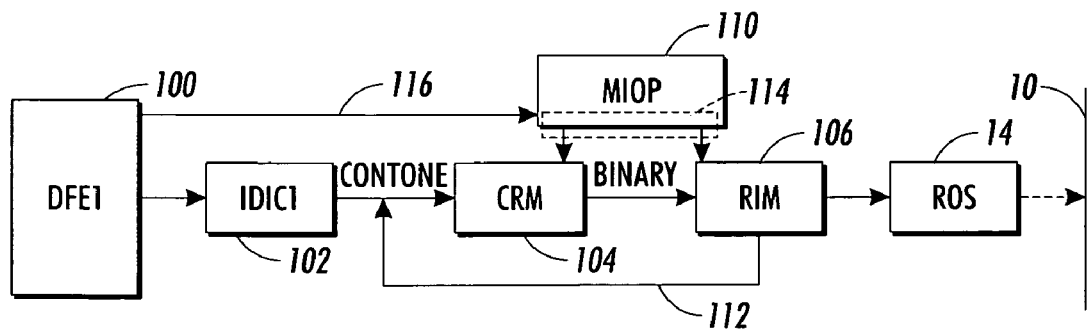
FIG. 2 is a schematic, block diagrametric view of a monochrome print platform including a digital front end communicating with selected components of an image path.

FIG. 2 illustrates a single "channel" for image data, such as would be used by itself in a monochrome printer, or as one channel among many, one channel for each primary color, in a full-color system. Although the output of the illustrated embodiment is the laser 14 such as described above, the disclosed embodiments relate to other image modulating devices, such as LED bars, LCD arrays, etc, or to other printing technologies, such as ink-jet, etc.

Referring still to FIG. 2, DFE1 100 accepts data for images desired to be printed in any one of a number of possible formats, such as, for example, HP PCL, or Adobe® PostScript™. This image data is then "interpreted" or "decomposed" in a known manner into a format usable by downstream circuitry and software. The decomposed data is first applied to an image data interface card (IDIC) 102; the output of IDIC 102 is, where required, "contone" ("continuous tone") data concerning specific locations, or pixels in the desired image. In general, contone data can be defined as a scalar number (such as from 0 to 255) symbolic of the desired darkness of the particular indicated area in the image. This contone data is then sent to what is called a "contone rendering module," or CRM, 104. As is known in the art, most currently-popular digital printing technologies, such as xerography and ink jet, are in effect "binary" at the pixel level: any particular pixel can be only black (or saturated in a color) or not-black (no color). In order to obtain a halftone or gray area, the contone data may be converted to a screen or other "halftone" pattern, which, over an area slightly larger than the pixel level, approximates the desired darkness. CRM 104 performs this conversion. The output of CRM 104 is binary data which, by itself, is largely directly operative of hardware, such as to modulate an imaging laser or activate an ink-jet ejector within a printhead at a particular time. The binary data from CRM 104 is typically passed through, in this case, a ROS (raster output scanner) interface module, or RIM, indicated as 106. The RIM reorganizes and synchronizes the binary image data for synchronous delivery to the laser 14 in cooperation with, for example, the motion of photoreceptor 10.

The basic image path elements described above may be controlled by a marker I/O processor, or MIOP, 110. MIOP 110 is connected to the electronic circuitry (ASICS or printed circuit boards) forming CRM 104 and RIM 106, with controlling, messaging, and data passing means, such as through a VME32 bus 114; it in turn may receive instructions from DFE1 100 by way of alternate communication channel 116.

Figure 3:
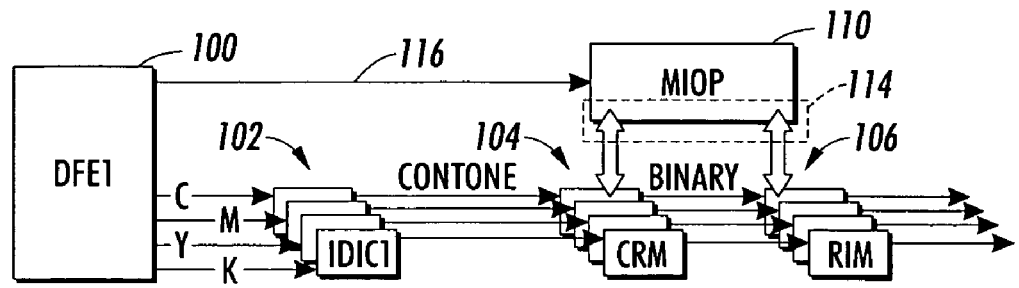
FIG. 3 is a schematic, block diagrametric view of a color print platform including a digital front end communicating with selected components of an image path.

The image path of FIG. 2 is, as previously mentioned, suitable for a monochrome printer, or for a single color separation in a full-color printer. In a color embodiment of the disclosed embodiments, there is provided a plurality of such channels as shown in FIG. 2; an implementation of such a color version is shown in FIG. 3. As can be seen, the various elements shown in the image path of FIG. 2 are replicated for each primary color; a single MIOP 110 can interact with the DFE1 100 to coordinate activities of each image path.

Figure 4:
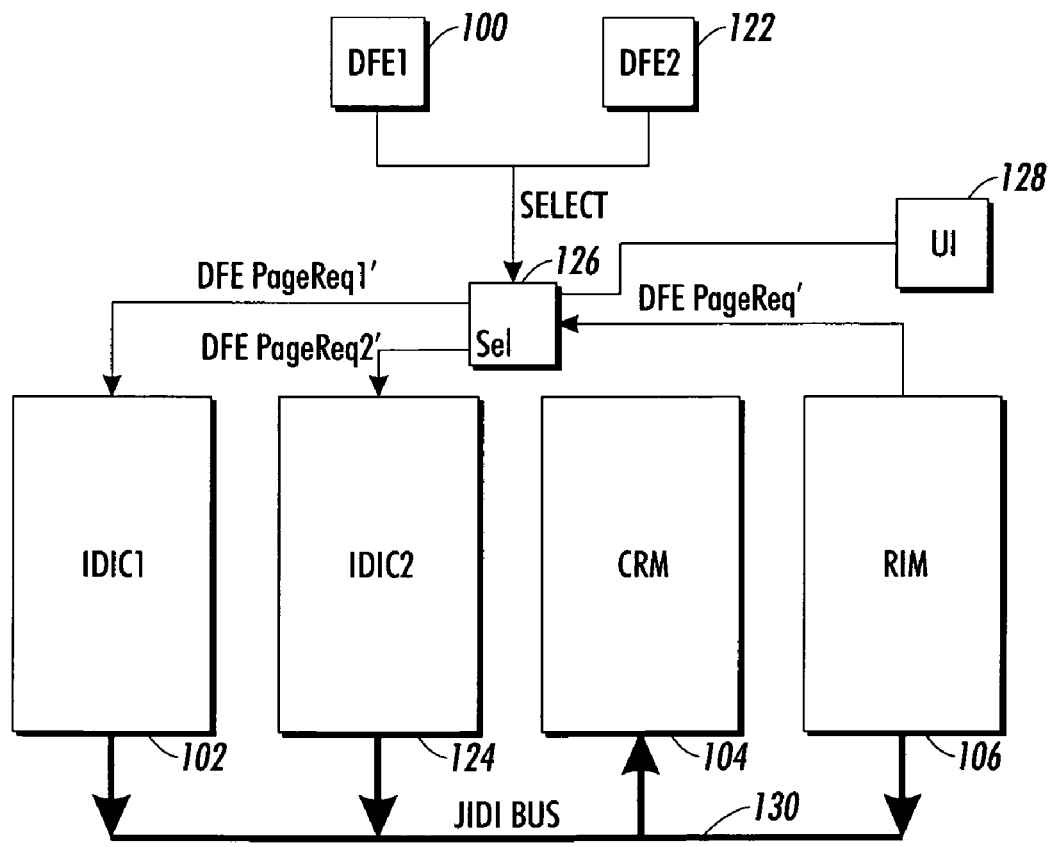
FIG. 4 is a schematic, block diagrametric view of a print platform with a switchable control arrangement.

Referring now to FIG. 4, a multiple DFE input system adapted for use with a monochrome or color printing engine is designated by the numeral 120. As shown in FIG. 4, DFE1 100 and DFE2 122 are selectively connected with "cards" IDIC1 102, IDIC2 124, CRM 104 and RIM 106 by way of a selection network 126. The selection network 126 communicates with a conventional user interface (UI), designated with the numeral 128, the significance of which will appear below. Also, as described above (and as described with respect to U.S. Pat. No. 6,526,240, the pertinent portions of which are incorporated herein by reference), the cards operate in a control platform or "card cage." A few generalizations about the system of FIG. 4 follow:

In one example of operation, DFE1 100 may be predominately suited for one application area (e.g., graphic arts application) and DFE2 122 may be predominately suited for another application area (e.g., standard color printing application).

The IDIC1, IDIC2, CRM and RIM boards ("Boards") share an image data interface bus (e.g., a "JIDI bus" used in Xerox iGen3™ 110 Digital Production Press), designated by the numeral 130. Thus the IDIC1, IDIC2 or RIM boards can selectively deliver images to the bus 130. Also, consistent with the description above, one set of Boards (or at least a partial set of Boards) is preferably provided for each color separation. So for a CMYK printing arrangement (See e.g., FIG. 3), each one of IDIC1, IDIC2 and RIM would comprise a set of four boards.

The current card cage allows either the IDIC1, IDIC2 or the RIM card to control the bus 130 based upon the status of two mutually exclusive signals: Int_ImgReq' (Internal Image Request) and DFE_PageReq' (DFE Page Request). In one mode of operation, DFE_PageReq' is the signal used to coordinate image data transfer from either DFE1 100 to IDIC1 102 or DFE2 122 to IDIC2 124. More particularly, there is a "negotiation" across the DFE PageReq lines to determine when IDIC1 or IDIC2 is ready to receive print-related information from either DFE1 or DFE2. This form of negotiation is currently used in configurations including a DocuSP ("DocuSP" is a trademark used by Xerox Corporation) DFE communicatively coupled with a Xerox iGen3™ 110 Digital Production Press.

Figure 5:
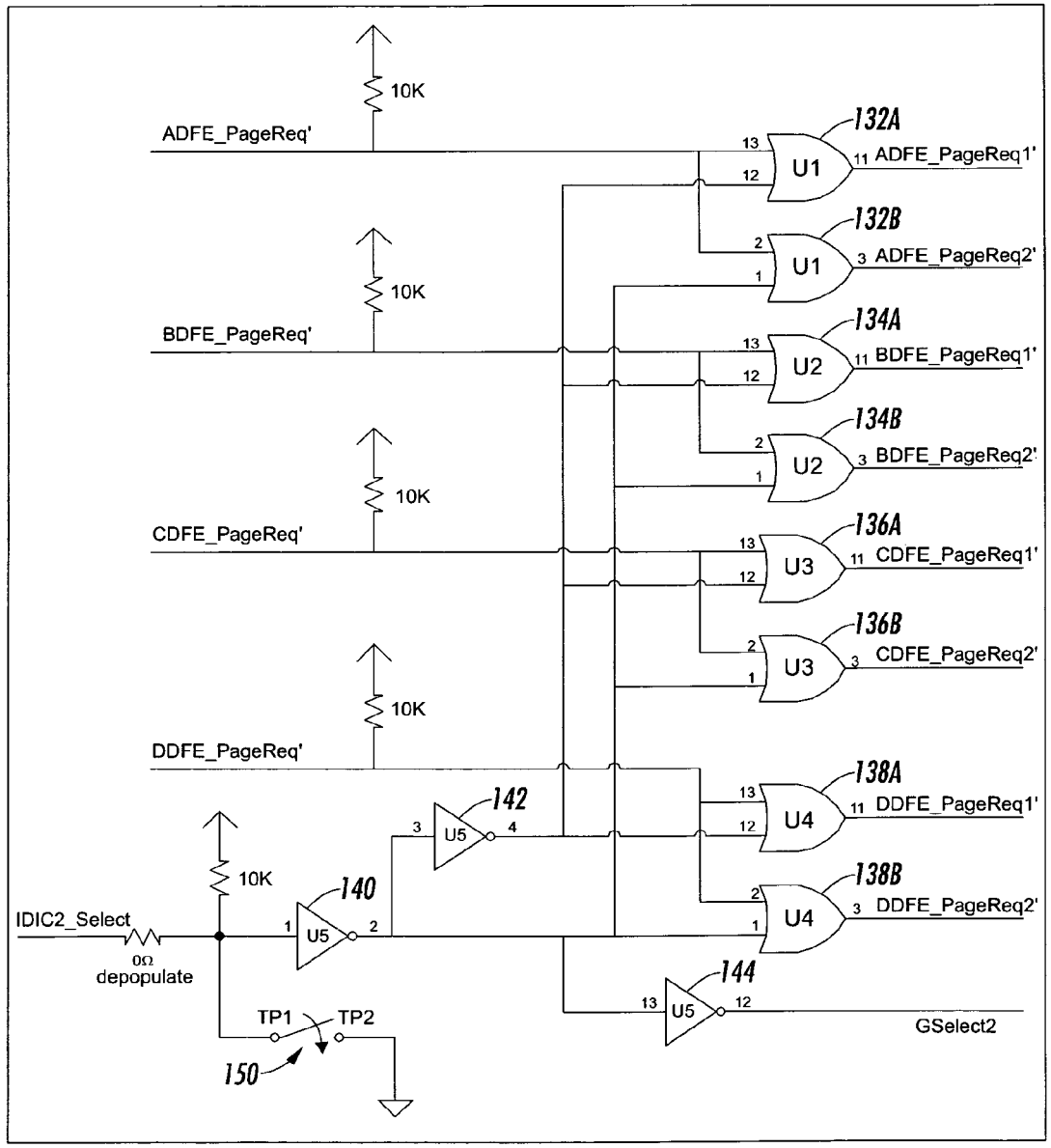
FIG. 5 is a schematic elevational view of a switching network for selectively connecting multiple digital front ends to an image path.

Referring now to FIG. 5, the structure and operation of selection network 126 is described in further detail. In a CMYK example of operation, the request signal corresponding with the first separation ("ADFE_PageReq'") is selectively transmitted to gates 132A and 132B, the request signal corresponding with the second separation ("BDFE_PageReq'") is selectively transmitted to gates 134A and 134B, the request signal corresponding with the third separation ("CDFE_PageReq'") is selectively transmitted to gates 13A6 and 136B, and the request signal corresponding with the fourth separation ("DDFE_PageReq'") is selectively transmitted to gates 138A and 138B. Additionally, a first select signal ("IDIC2_Select" passed through inverters 140 and 142) is input to gates 132B, 134B, 136B and 138B. Finally, a second select signal (inverted IDIC_Select passed through inverter 144), is transmitted to an error detection circuit 146 (FIG. 6), the significance of which is discussed below.

It should be noted that while 4 sets of OR gates are shown for the implementation of FIG. 5 (corresponding with a four separation printing system), more or less OR gates sets could be employed, depending on the number of separations required by an associated printer. Additionally, the disclosed logical devices of FIG. 5 could be implemented with alternative logical devices and/or through use of a programmable gate array. Finally, the selection network 126 is provided with a manual selector 150, the significance of which will be described below.

Referring still to FIG. 5, in one exemplary form of operation, the first select signal is maintained as an active high. In this way PageReq1 signals are output from gates 132A, 134A, 136A and 138A, while gates 132B, 134B, 136B and 138B are maintained in a low state. That is, when the first select signal is high, DFE1 100 operates in conjunction with IDIC1 102 to provide the default control system for the printing system 8, and DFE2 122 is maintained in an inactive state. To change the default control system, a user accesses the user interface 126 (FIG. 4) to change the state of the first select signal from a normal high to an active low. In this way PageReq2 signals are then output from gates 132B, 134B, 136B and 138B, while gates 132A, 134A, 136A and 138A are maintained in a low state. That is, when the first select signal is an active low, DFE2 122 operates in conjunction with IDIC2 124 to provide the default control system for the printing system 8, and DFE1 100 is maintained in an inactive state.

In a slight variation of the above-described operation a user, preferably a service technician or the like, can change the state of the first select signal without employing a user interface. In particular, the service technician or the like can access the manual selector 150 to change the state of the first select signal from high to active low, or vice versa.

Figure 6:
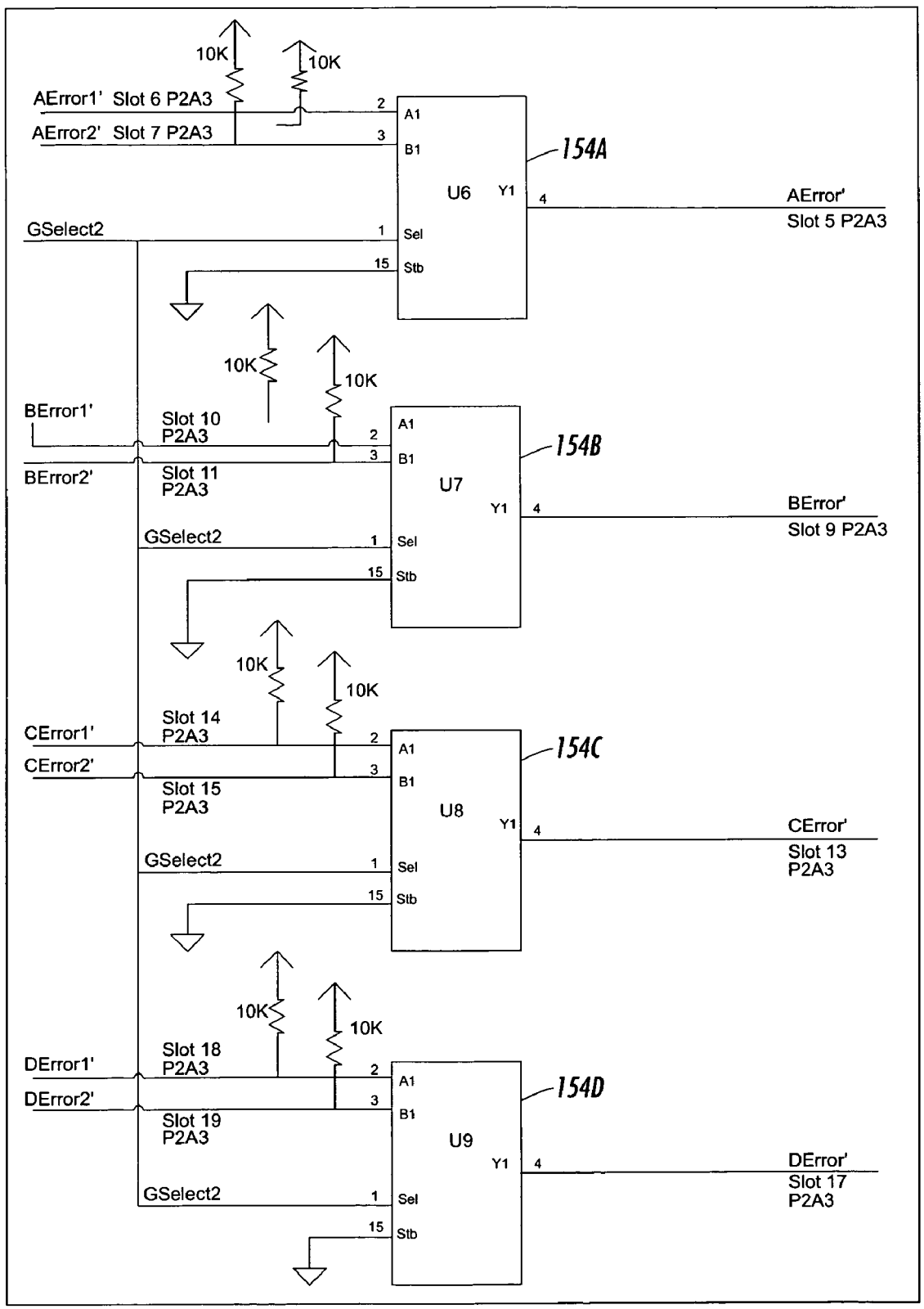
FIG. 6 is a schematic elevational view of an error detection circuit for detecting errors that might arise in print platforms with multiple digital front ends, such as the print platform shown FIG. 4.

Referring now to FIG. 6, the structure and operation of the error detection circuit 146, in which a 2:1 multiplexer is provided for each separation, is described. For the exemplary arrangement of FIG. 5, four multiplexers, designated by the numerals 154A, 154B, 154C and 154D are provided. It should be appreciated that more or less multiplexers could be employed, depending on the number of separations required by an associated printer. In the exemplary configuration of FIG. 6, the second select signal ("GSelect2'") is input to each one of the four multiplexers, and the state of the second select signal determines which of the error signals ("AError1'" and AError2'" for multiplexer 154A; "BError1'" and BError2'" for multiplexer 154B; "CError1'" and CError2'" for multiplexer 154C; and "DError1'" and DError2'" for multiplexer 154D), if any, are output from the multiplexers.

To comprehend the operation of the error detection circuit it should be understood that each one of the IDIC1 102 and IDIC2 124 includes N boards corresponding with N separations, and that each board is associated with a given slot. For instance, referring to the upper left hand corner of FIG. 6, the first of four IDIC1 boards corresponds with "Slot 6 P2A3" and the first of four IDIC2 124 boards corresponds with "Slot 7 P2A3." As contemplated by the exemplary implementation of FIG. 6, when Gselect2 is high, then errors associated with IDIC1 may be "seen" at either the AError' output (in the form of AError1'), the BError' output (in the form of BError1'), the CError' output (in the form of CError1'), or the DError' output (in the form of DError1'). When Gselect goes low, then errors associated with IDIC2 may be seen at either the AError' output (in the form of AError2'), the BError' output (in the form of Berror2'), the CError' output (in the form of Cerror2'), or the DError' output (in the form of Derror2'). It should be noted that the error signals for all of the separations are visible to the MIOP 110 (FIG. 3), and that each error signal provides the MIOP with an indication of the existence of an implementation error between the DFE and the image path or print engine. An implementation error might relate to the proper placement or operation of one of the IDIC cards in its intended slot. Thus, for instance, if GSelect2 were low and AError2' was detected by the MIOP, then it would follow that an error (relating to, for instance, faulty board placement) exists relative to the slot for the first board of IDIC2 124.

In view of the above description, many features of the disclosed embodiments should now appear:

The capability to select among multiple "in-place" DFEs permits the owner of a single print engine to fully and safely exploit several printing applications. For instance, in one implementation the owner might be provided the opportunity to obtain a graphics application in one mode of operation, and a standard color printing application in another. The fact that the DFEs are in-place ensures that damage resulting from repeated insertion and removal of related components is minimized.

The switching aspect of the selection network can be constructed from a simple, yet effective arrangement of logical components. By using sets of readily available digital gates (such as OR or NOR gates), cost can be minimized and scalability (corresponding with the number separations to be employed) easily achieved. Also, the design of the switching aspect makes it very easy to switch between DFEs by simply altering the state of a first select signal. Configuring the digital gates in a programmable gate array can further optimize cost and convenience.

The manner in which the DFEs can be configured with the image path also promotes scalability. In particular, since the IDIC, CPM and RIM boards share the same image date interface bus, multiple IDIC boards can be used in the image path without significantly altering system architecture.

Implementation errors among the multiple DFEs and the image path can be readily detected through use of a simple, yet effective error detection circuit. In one example of operation, a set of multiplexers, working in conjunction with the MIOP, can be used to ensure, among other things, that all components of the system (including DFEs and IDICs) are properly installed.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A printing system for producing prints from a print job, comprising:

a first digital front end capable of decomposing the print job;

a second digital front end capable of decomposing the print job;

an image path, communicating selectively with said first digital front end and said second digital front end, for receiving a decomposed print job from said first digital front end when said first digital front end and said image path are configured in a first mode, and for receiving a decomposed print job from said second digital front end when said second digital front end and said image path are configured in a second mode; and a selection system for disposing either said first digital front end and said image path in the first mode, or said second digital front end and said image path in the second mode, wherein said selection system includes a first logical gate and a second logical gate, and wherein said first digital front end and said image path are disposed in the first mode when a first signal is output from said first logical gate, and said second digital front end and said image path are disposed in the second mode when a second signal is output from said second logical gate.

2. The printing system of claim 1, in which a select signal, changeable between one of a first magnitude and a second magnitude, is input simultaneously to each one of said first logical gate and said second logical gate, wherein the respective outputs of said first and second logical gates change as a response to a change in the select signal between the first magnitude and the second magnitude.

3. The printing system of claim 2, further comprising a user interface adapted to change the magnitude of the select signal in response to user input.

4. The printing system of claim 1, wherein (a) said selection system includes a third logical gate and a fourth logical gate, (b) said first and second logical gates correspond with a first color separation, and (c) said third and fourth logical gates correspond with a second color separation.

5. The printing system of claim 4, further comprising a logical gate array, wherein said first, second, third and fourth gates are part of said logical gate array.

6. The printing system of claim 1, wherein (a) said image path includes a first image data interface card and a second image data interface card, (b) said first image data interface card is corresponded with said first digital front end when said first digital front end and said image path are configured in the first mode, and (c) said second image data interface card is corresponded with said second digital front end when said second digital front end and said image path are configured in the second mode.

7. The printing system of claim 6, further comprising an image data interface bus, wherein each one of said first image data interface card and said second image data interface card selectively communicate with said image data interface bus.

8. The printing system of claim 1, wherein said selection system includes an error correction subsystem for testing for and detecting of implementation errors among said first digital front end, said second digital front end, and said image path.

9. The printing system of claim 8, wherein said error correction subsystem includes one or more multiplexers, and wherein the output of said one or more multiplexers provides information about at least one of the implementation errors among said first digital front end, said second digital front end, and said image path.

10. The printing system of claim 9, in which the printing system is a color printing system processing the print job in N separations, wherein said error correction subsystem comprises N multiplexers.

11. The system of claim 1, wherein the first digital front end comprises a graphics application.

12. The system of claim 1, wherein the first digital front end comprises a standard color printing application.

13. The system of claim 1, wherein the first digital front end comprises a standard color printing application and the second digital front end comprises a graphics application.

14. The system of claim 1, wherein at least one of the first logical gate and the second logical gates are of at least one of AND, OR, NOR gates.

15. A print control system for use with a print engine, comprising:
a first control subsystem for decomposing a first job to obtain a first set of print-related information;
a second control subsystem for decomposing a second job to obtain a second set of print-related information; and
a switching system communicating selectively with said first control subsystem and said second control system; said switching system being disposed in a first switching state at a first time to direct the first set of print-related information from said first control subsystem to the print engine, and being disposed in a second switching state at a second time to direct the second set of print-related information from said second control subsystem to the print engine, wherein the switching system includes a first logical gate and a second logical gate, and wherein said switching system is disposed on the first switching state when a first signal is output from the first logical gate, and said switching system is disposed in the second switching state when a second signal is output from second logical gate.

16. The print control system of claim 15, in which a select signal, changeable between a first magnitude and a second magnitude, is input simultaneously to each one of said first logical gate and said second logical gate, wherein the respective outputs of said first and second logical gates change as a response to a change in the select signal between the first magnitude and the second magnitude.

17. The print control system of claim 15, wherein (a) said switching system includes a third logical gate and a fourth logical gate, (b) said first and second logical gates correspond with a first color separation, and (c) said third and fourth logical gates correspond with a second color separation.

18. The print control system of claim 15, wherein the first digital front end comprises one of a standard color printing application and a graphics application.

19. A method for producing prints from a print job, comprising:
configuring a first digital front end, a second digital front end and image path in such a way that the image path receives a rasterized print job from the first digital front end when the first digital front end and the image path are configured in a first mode, and that the image path receives a rasterized print job from the second digital front end when the second digital front end and the image path are configured in a second mode, wherein the configuring includes configuring a first logical gate and a second logical gate in such a way that the first digital front end and the image path are disposed in the first mode when a first signal is output from the first logical gate, and the second digital front end and the image path are disposed in the second mode when a second signal is output from second logical gate; and
disposing either the first digital front end and the image path in the first mode, or the second digital front end and the image path in the second mode.

20. The method of claim 19, wherein said configuring includes providing third and fourth logical gates, further comprising corresponding the first and second logical gates with a first color separation and corresponding the third and fourth logical gates with a second color separation.

21. The method of claim 19, further comprising detecting implementation errors among the first digital front end, the second digital front end, and the image path.

* * * * *